US010194378B2

(12) United States Patent
Bird et al.

(10) Patent No.: US 10,194,378 B2
(45) Date of Patent: Jan. 29, 2019

(54) ACCESS PORT QUEUING AND RESOURCE MANAGEMENT

(71) Applicant: Google LLC, Mountain View, CA (US)

(72) Inventors: David Bird, Mountain View, CA (US); Jeremie Emmanuel Texier, San Francisco, CA (US)

(73) Assignee: Google LLC, Mountain View, CA (US)

( * ) Notice: Subject to any disclaimer, the term of this patent is extended or adjusted under 35 U.S.C. 154(b) by 661 days.

(21) Appl. No.: 14/801,068

(22) Filed: Jul. 16, 2015

(65) Prior Publication Data

US 2017/0019836 A1    Jan. 19, 2017

(51) Int. Cl.
*G06Q 20/40* (2012.01)
*H04W 48/16* (2009.01)
*H04W 48/02* (2009.01)
*H04W 72/12* (2009.01)
*H04W 88/08* (2009.01)

(52) U.S. Cl.
CPC ........... *H04W 48/16* (2013.01); *G06Q 20/40* (2013.01); *H04W 48/02* (2013.01); *H04W 72/1247* (2013.01); *H04W 88/08* (2013.01)

(58) Field of Classification Search
CPC .................................................. G06Q 20/40
USPC .......................................................... 705/44
See application file for complete search history.

(56) References Cited

U.S. PATENT DOCUMENTS

| 6,772,202 | B2* | 8/2004 | Wright .................... H04L 29/06 709/217 |
| 7,095,754 | B2 | 8/2006 | Benveniste |
| 7,684,333 | B1 | 3/2010 | Dasylva et al. |
| 7,957,394 | B1* | 6/2011 | Cohen ................. H04L 41/0806 370/230.1 |
| 8,184,582 | B2 | 5/2012 | Banerjee et al. |
| 8,593,967 | B2 | 11/2013 | Fang |
| 2009/0067328 | A1* | 3/2009 | Morris .............. H04W 72/1242 370/230.1 |

(Continued)

FOREIGN PATENT DOCUMENTS

| WO | 02/01836 | * | 1/2002 |
| WO | 2013/048474 | | 4/2013 |

OTHER PUBLICATIONS

Extended European Search Report issued in European Application No. 16179900.2 dated Sep. 13, 2016, 12 pages.

(Continued)

*Primary Examiner* — Jessica Lemieux
(74) *Attorney, Agent, or Firm* — Fish & Richardson P.C.

(57) ABSTRACT

Methods, systems, and apparatus, including computer programs encoded on computer storage media, for receiving, at the one or more wireless access points and from a first device, a request to connect to a first network through a wireless network managed by the one or more wireless access points, wherein the one or more wireless access points is controlling access to the first network through a plurality of ports; determining each port in the plurality of ports is connected to a respective device, each respective device being allowed to access the first network through the respective port; and adding the first device to a queue, wherein the queue includes at least a second device that was added prior to the first device, where devices in the queue are not allowed to access the first network while in the queue.

20 Claims, 6 Drawing Sheets

(56) References Cited

U.S. PATENT DOCUMENTS

2011/0116444 A1* 5/2011 Relyea .............. H04W 72/0453
370/328

OTHER PUBLICATIONS

Gomes et al., "A Queue Management Mechanism for Improving TCP fairness in Wireless Access Networks," XXVIII Simpósio Brasileiro de Redes de Computadores e Sistemas Distribuídos, pp. 871-884, 2010.
Kim et al., "Queuing Analysis for IEEE 802.11e Networks in Non-Saturation Environments," Int. J. Adv. Robotic Sy., 2012, vol. 9, Special Issue: Advanced Technologies and Applications for Smart Robot and Intelligent Systems, Feb. 13, 2012, pp. 1-9.
Malone et al., "Inferring Queue State by Measuring Delay in a WiFi Network," Traffic Monitoring and Analysis Lecture Notes in Computer Science vol. 5537, 2009, pp. 8-16.

* cited by examiner

Services Needed:

[x] E-mail
[ ] Video
[x] Voice

Estimated Wait Time: 0 min

ACCESS PORT QUEUING AND RESOURCE MANAGEMENT

BACKGROUND

This specification relates to queuing devices for connection to a network using one or more wireless access points.

Multiple devices can connect to a network, e.g., the Internet, through a wireless access point. The wireless access point can have a particular amount of bandwidth that is split between the multiple devices. The bandwidth can be split according to network congestion avoidance algorithms, e.g., a congestion avoidance algorithm specified by Transmission Control Protocol (TCP). Therefore, each device can have access to a variable amount of bandwidth. In some implementations, to limit the number of devices accessing the network, the wireless access point only allows access to devices that have provided a predetermined password.

In some implementations, the wireless access point runs a captive portal. The captive portal can cause a custom page, e.g., a login page, to be displayed on a user's device before the user can access the network normally. For example, the captive portal can intercept packets sent to and from the device and redirect a browser of the device to the custom page until the user provides authentication or payment.

SUMMARY

In general, this specification describes a system for queuing devices for connection to a network using one or more wireless access points.

In general, one innovative aspect of the subject matter described in this specification can be embodied in methods that includes the actions of receiving, at the one or more wireless access points and from a first device, a request to connect to a first network through a wireless network managed by the one or more wireless access points, wherein the one or more wireless access points is controlling access to the first network through a plurality of ports; determining each port in the plurality of ports is connected to a respective device, each respective device being allowed to access the first network through the respective port; and adding the first device to a queue, wherein the queue includes at least a second device that was added prior to the first device, where devices in the queue are not allowed to access the first network while in the queue.

Implementations can include one or more of the following features. Determining a particular port in the plurality of ports is available to a device in the queue to access the first network; removing the second device from the queue; connecting the second device to the particular port to allow the second device to access the first network; and moving the first device up in the queue. Prior to adding the first device to the queue: providing a user interface for display at the first device, the user interface prompting a user of the first device to be placed in the queue; and receiving user input from the first device specifying an intent to be added to the queue. Adding the first device to the queue comprises: identifying a particular queue in a plurality of queues to which the first device is added based on the user input; and adding the first device to the particular queue. The plurality of queues comprises a priority queue and a non-priority queue, where the user input specifies to which of the plurality of queues the first device is added, where devices in the priority queue have a higher bandwidth constraint than devices in the non-priority queue when accessing the first network. The user input further specifies payment information in exchange for accessing the priority queue, further comprising: submitting a payment transaction including the payment information to a payment processor, receiving authorization of the payment transaction; and adding the first device to the priority queue. The user interface prompts a user of the first device to select a class of data packets to be accessible to the first device when connected to the wireless network, where the first device is limited to only accessing the selected class of data packets when accessing the first network. The class of data packets comprises at least a class of email data packets or a class of voice data packets. The user interface prompts for contact information of a user of the first device, further comprising: determining the first device is near a start of the queue; sending a notification to the first device using the contact information, the notification indicating a position of the first device in the queue. Computing an estimated wait time for the first device to be allowed access to the first network based on sessions of devices connected to the plurality of ports, where the user interface displays the estimated wait time. Adding the first device to the queue comprises: determining session requirements for the first device; accessing data describing, for each queue of a plurality of queues, associated session requirements met by that queue and where the session requirements met for each queue are different; selecting one of the queues as a selected queue based on a matching of the session requirements for the first device and the associated session requirements met by the selected queue; and adding the first device to the selected queue. The session requirements met by each queue include a quality of service requirement. The session requirements met by each queue include a session time requirement. Each of a subset of ports in the plurality of ports has a respective fixed bandwidth constraint that is less than a bandwidth constraint for the wireless network, where the respective device connected to each respective port in the subset of ports is limited to the respective fixed bandwidth constraint. Each of a subset of ports in the plurality of ports is constrained to serve a class of data packets, where the respective device connected to each respective port in the subset of ports is limited to accessing the class of data packets. A subset of ports in the plurality of ports have quality of service guarantees and ports not in the subset do not have quality of service guarantees.

Particular embodiments of the subject matter described in this specification can be implemented so as to realize one or more of the following advantages. The system can ensure a quality of service to devices accessing the network through the one or more wireless access points by limiting a number of devices concurrently utilizing available bandwidth. The system can fairly track which device is allowed to access the network depending on a position of the device in a queue. The system can provide an estimated wait time of how long until a device can access the network. Users can choose to place their device in different types of queues with the system, thereby causing the system to allow their device to access different levels of bandwidth based on the queue the device is in. The system can reduce a device's wait time in the queue if a user chooses to provide payment. The system can also limit particular devices to access a certain class of data packets, e.g., email or voice data, on the network, which can increase the number of devices that are allowed to access the network without compromising quality of service.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is an example user interface displayed at a device for selecting which queue the device will be added to.

FIG. 5 is an example user interface displayed at a device for selecting which services will be available during a session.

Like reference numbers and designations in the various drawings indicate like elements.

DETAILED DESCRIPTION

Figure 1:
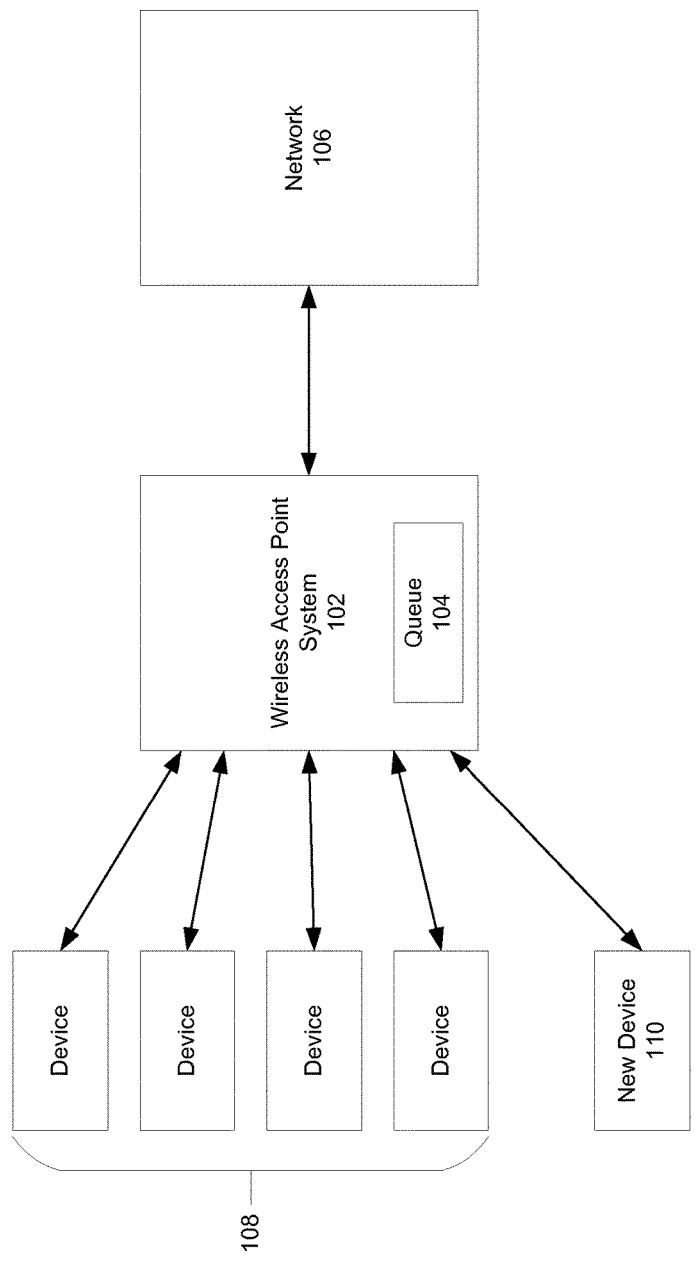
FIG. 1 illustrates an example architecture for a system that queues devices for connection to a network.

FIG. 1 illustrates an example architecture 100 for a system that queues devices for connection to a network. Devices 108 can be connected to a wireless access point system 102. The wireless access point system 102 can be connected to a network 106, e.g., an internal network or an external network like the Internet. Devices 108 can access the network through the wireless access point system 102.

Each device can include a memory, e.g., a random access memory (RAM), for storing instructions and data and a processor for executing stored instructions. The memory can include both read only and writable memory. The device can be a smartphone, tablet, a desktop computer, or a laptop computer. The device is capable of receiving user input, e.g., through a touchscreen display or a pointing device, e.g., a mouse or a keyboard.

The wireless access point system 102 can include one or more wireless access points networked together. Each wireless access point can be a device that allows wireless devices, e.g., devices 108, to connect to the network 106, e.g., the Internet, using Wi-Fi or other wireless networking standards.

The wireless access point system 102 can have a set of ports, each of which can connect a respective device to the network 106. That is, when the device is connected to a port, the wireless access point system 102 can allow the device to access the network 106. If the device is connected to the wireless access point system 102 but is not connected to any port, the wireless access point system 102 can deny the device access to the network 106. In some implementations, the wireless access point system 102 predetermines the number of ports available for connection to the network 106.

In some implementations, when the wireless access point system 102 allows a device to access the network 106 through a particular port, the wireless access point system 102 creates a session for the device. The session can specify how long the device can access the network 106 before disconnecting the device from the network or what class of resources, e.g., email, video, or voice data, the device can access from the network 106.

The wireless access point system 102 can manage which devices can access the network 106 using a queue 104. The queue 104 can be a data structure that stores device identifying information in a particular order. In some implementations, the devices are ordered in a first-in-first-out (FIFO) method. Device identifying information can include a media access control (MAC) address or a unique hardware identifier of a device.

In some implementations, the wireless access point system 102 manages multiple types of queues. This will be described further below in reference to FIG. 4. Each queue can be associated with a subset of ports. When removing a particular device from a respective queue so the particular device can access the network, the wireless access point system 102 can assign, i.e., connect, the device to a port in the subset of ports. The subset of ports can have one or more constraints which apply to devices connected to the subset of ports. Constraints can include a quality of service measure, e.g., a bandwidth amount, a class of data packets, a time interval, or a price. The constraints will be described further below in reference to FIGS. 4-5.

By way of illustration, if the wireless access point system 102 is limiting access to the network to only the devices 108, when a new device 110 connects to the wireless access point system 102, the wireless access point system 102 can place device identifying information of the new device 110 in the queue 104. The wireless access point system 102 can allow the new device 110 to access the network 106 once one of the devices 108 no longer accesses the network 106, e.g., the one of the devices 108 is disconnected or has a session that expired. This will be described further below in reference to FIGS. 2-5.

Figure 2:
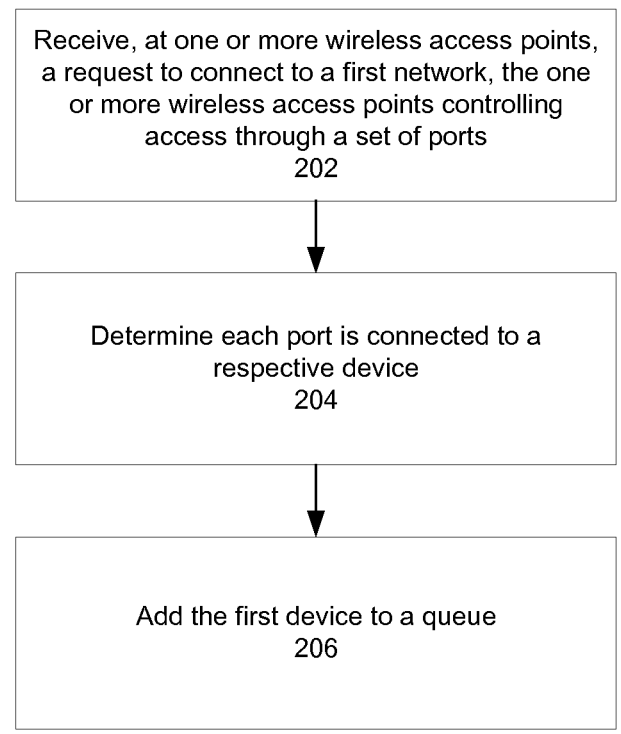
FIG. 2 is a flow diagram of an example method for queuing devices for connection to the network.

FIG. 2 is a flow diagram of an example method for queuing devices for connection to the network. For convenience, the method 200 will be described with respect to a system, e.g., the system 102 of FIG. 1, having one or more computing devices that execute software to implement the method 200.

The system receives a request from a first device, e.g., a mobile smartphone, to connect to a network, e.g., the Internet (step 202). The request can be received at one or more wireless access points of the system. In some implementations, the request is a Hypertext Transfer Protocol (HTTP) request. In some implementations, the request is for the device to connect to the one or more wireless access points, e.g., a request conforming to a WiFi access protocol.

The system determines each port is connected to a respective device (step 204). That is, the system can have a number of ports which connect devices to the network, and each port is being used by a respective device. The system can track, e.g., in an access log, which of the ports are being used. In some implementations, a port is used, i.e., available, if the system has assigned a device to the port, which allows the device to access the network. The port can be unused, i.e., unavailable, if no device is assigned to the port.

Because each port is connected to a respective device, the system adds the first device to a queue (step 206). In some implementations, the system adds device identifying information of the first device to the queue. In some implementations, the queue includes at least a second device that was added prior to adding the first device. Devices in the queue can be connected to the system but not connected to any ports, and therefore are not allowed to access the network.

In some implementations, the first device specifies particular session requirements when connecting to the network. For example, the first device can specify a bandwidth level requirement when accessing the network, a class of data packets to be accessible from the network, a length of time to be connected to the network, or a monetary amount a user of the first device is willing to spend to connect to a particular port. The session requirements can be specified through a user interface, which will be described below in reference to FIGS. 4-5, or can be specified through a user profile for the first device registered at the system.

The system can identify queues that match the session requirements of the first device. The system can compare the session requirements with constraints associated with each queue. In some implementations, each queue has a different set of constraints, which apply to associated respective ports of each queue.

The system can select one of the queues to which the first device is added based on the matching, and the system can add the first device to the selected queue. In some implementations, the first device connects to the system, and the system adds the first device to a particular queue based on the session requirements without any user interaction.

Figure 3:
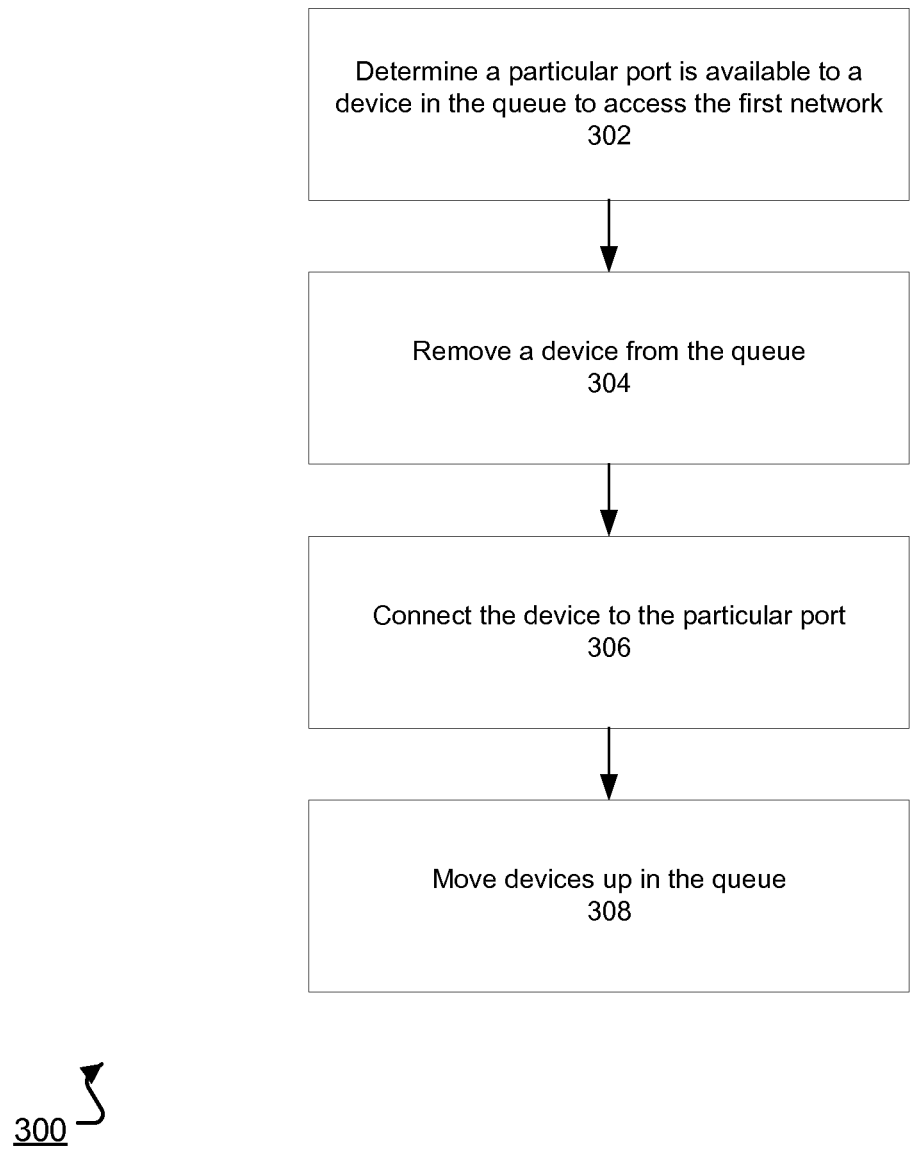
FIG. 3 is a flow diagram of an example method for shifting devices in a queue.

FIG. 3 is a flow diagram 300 of an example method for shifting devices in a queue. For convenience, the method 300 will be described with respect to a system, e.g., the system 102 of FIG. 1, having one or more computing devices that execute software to implement the method 300.

The system determines a particular port is available to one device in a queue to access a network (step 302). The system can track whether a device connected to the particular port disconnected from the system or whether an associated session for the device expired. In either case, the system can determine the particular port is available for use and can select a device in the queue to start a new session.

The system removes a device from the queue (step 304). The removed device can be a device at a front of the queue. When removing the device from the queue, the system can remove device identifying information for the removed device from a data structure of the queue. In some implementations, the system notifies a first device at the front of the queue to start a session, and if the device does not respond to the notification within a threshold of time, the system can notify a second device positioned after the first device in the queue. If the second device provides user input indicating an intent to start the session, the system can remove the second device from the queue.

The system connects the device to the particular port to allow the device to connect to the network (step 306). The system can generate a session that associates the particular port with the device. During the session, the device can access the network according to constraints, if any, of the particular port.

The system shifts devices within the queue (step 308). Once a device is removed, the system can shift every other device in the queue up a position in the queue.

Figure 4:
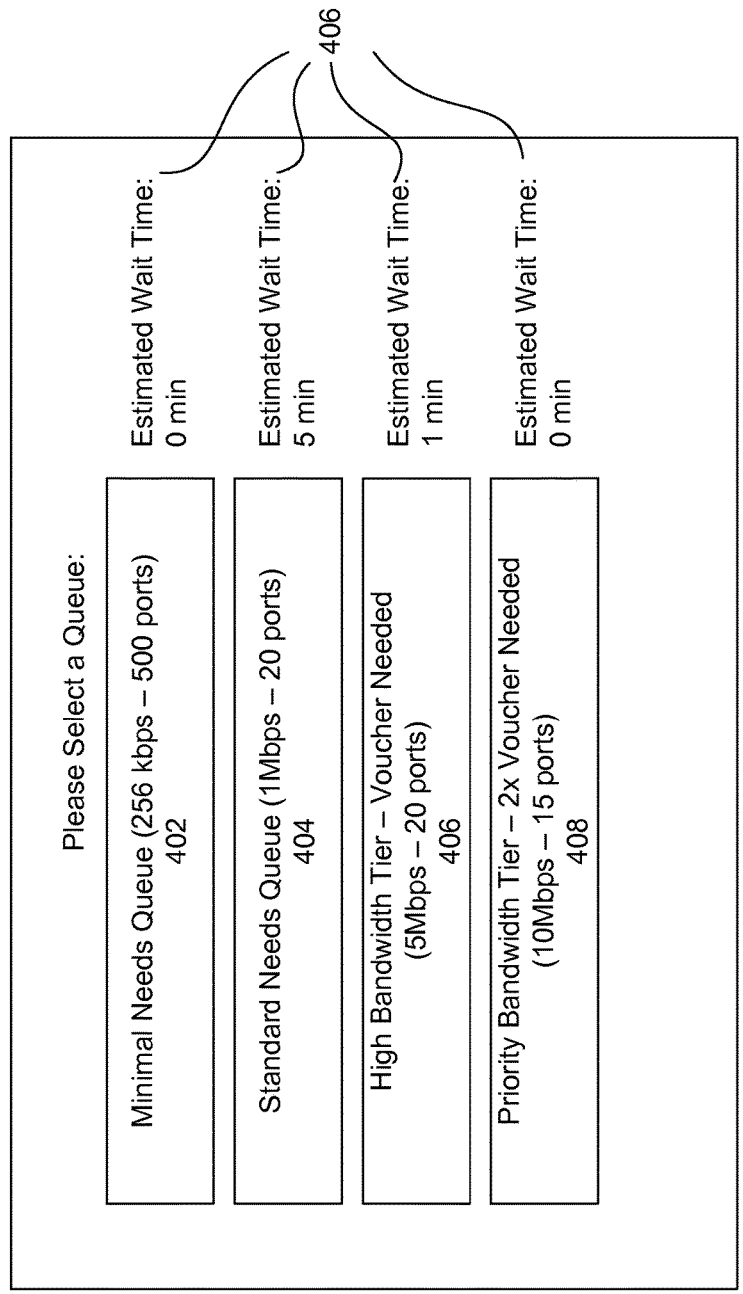

FIG. 4 is an example user interface 400 displayed at a device for selecting which queue the device will be added to. The user interface 400 can be displayed after the device connects to a system, e.g., the system 102 of FIG. 1. The user interface 400 can be displayed at a browser or at a configuration dialog running on the device.

The system can have a large total bandwidth availability, e.g., a 100 Gbps bandwidth pipeline, and can split the bandwidth into fixed chunks for use in multiple queues. By splitting bandwidth availability, the system can ensure a quality of service measure for devices accessing the network. In some implementations, the quality of service measure is a metric that indicates how reliable the system is in providing consistent bandwidth to a device connected to the network. The system can assign various quality of service measures to one or more queues or to one or more respective ports.

The user interface 400 can display a set of queues managed by the system. Each queue can have particular constraints. For example, a "Minimal Needs Queue" 402 can have a bandwidth constraint of 256 kbps per device, and the system can have 500 ports with that constraint. That is, 500 devices, each subject to a maximum bandwidth of 256 kbps, can be concurrently connected to a network. A "Standard Needs Queue" 404 can have a bandwidth constraint of 1 Mbps per device, and the system can have 200 ports with that constraint. Each of these and other queues can also have a time constraint, e.g., a maximum of 1 hour per session, or a data cap constraint, e.g., a maximum of 1 GB download per session.

The system can also manage priority queues which require payment for access. For example, a "High Bandwidth Tier" 406 can have a bandwidth constraint of 5 Mbps per device and have a payment constraint, e.g., requiring a device to have a paid voucher to be placed in the queue, and the system can have 20 ports with those constraints. A "Priority Bandwidth Tier" 408 can have a bandwidth constraint of 10 Mbps per device and a payment constraint, e.g., requiring two vouchers, and the system can have 15 ports with those constraints.

The user interface 400 can display an estimated wait time 406 for each queue. The estimated wait time 406 can indicate how long until the device can be allowed access to the network. The system can compute an estimated wait time based on historical usage data of the system and a number of devices in the respective queue. For example, the system can identify an average session length for the "Minimal Needs Queue" 402 over an interval of time and use the average session length and the device's position in the queue as a basis for the wait time. The historical usage data can be stored in a database of the system.

The user interface 400 can receive user input from the device specifying which queue to add the device to. The system can add the device to the specified queue. In some implementations, if a user of the device specifies to add the device to a priority queue, e.g., the "High Bandwidth Tier" 406 or the "Priority Bandwidth Tier" 408, the system determines whether the user has paid for using the priority queue, e.g., using a payment transactions database. If the user has not paid for usage of the priority queue, the system can display another user interface requesting for payment information, e.g., text fields for credit card information. After the system receives the payment information, the system can submit a payment transaction for using the queue including the payment information to a payment processor. The system can receive authorization of the payment transaction from the payment processor and, in response, can add the device to the priority queue. In some implementations, payment from the user shifts a device multiple positions in a particular queue.

FIG. 5 is an example user interface 500 displayed at a device for selecting which services will be available during a session. The user interface 500 can be displayed after the device connects to a system, e.g., the system 102 of FIG. 1. In some implementations, one or more queues are associated with constraints of a class of data packets served to devices accessing the network. For example, when a device in a queue with a particular class of data packets constraint are removed from the queue and connected to a port associated with the queue, the device is allowed to only access data packets of the particular class from the network.

Data packets can be associated with one or more classes. For example, the network can serve e-mail data packets, video data packets, voice data packets, or data packets implemented in various protocols, e.g., peer-to-peer data packets. The system can identify the class associated with a data packet through a header or metadata of the packet.

The user interface 500 can receive user input from the device specifying a class of data packets to be accessible to a device when connected to the network. By way of illustration, the user interface 500 received user input specifying e-mail and voice data packets, but not video data packets. Therefore, during a session for the device, the system can serve only data packets of the selected classes. For example, the device can access e-mail or make a call over Voice over Internet Protocol (VOIP), but cannot access a video on the network.

In some implementations, the system can generate, on-demand, more ports for devices to access the network, but the generated ports can be subject to constraints of a particular class of data packets that has low bandwidth requirements, e.g., e-mail data packets. For example, when a device connects to the system and each port is connected to a respective device, the system can generate a port with an email data packet constraint for the device. The port can also not be associated with a quality of service measure. Therefore, the port can utilize unused bandwidth of the system.

In some implementations, the user interface 500 is displayed after the device selects a queue. The system can increase a position of the device in the queue if a user of the device constrains the device to accessing a particular class of data packets from the network.

Figure 6:
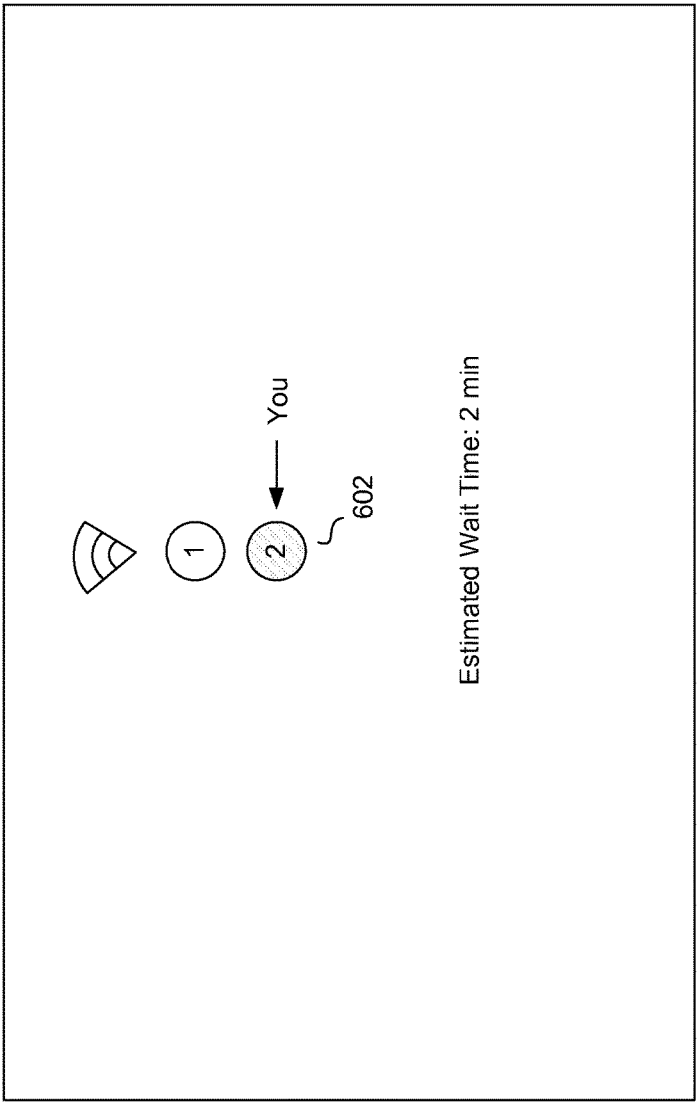
FIG. 6 is an example user interface displayed at a device for showing a position in the queue.

FIG. 6 is an example user interface 600 displayed at a device for showing a position of the device in a queue. The user interface 600 can be displayed after the device selects a queue in a system, e.g., the system 102 of FIG. 1. If the device provided user input specifying which queue to be added to, the system can generate instructions for the user interface 600 to be displayed at the device. The user interface 600 can display a position 602 of the device in the queue, e.g., the device is at position 2, and can display an estimated wait time until the device is allowed access to a network based on the position 602.

In some implementations, the system can notify the device, e.g., send a text message to the device, when the device is about to be allowed access to the network. For example, the system can receive, e.g., through a user interface or a user profile, contact information of a user of the device. The system can determine the device is near a start of the queue. For example, the system can determine the estimated wait time is less than a threshold amount of time, or the system can determine the device's position in the queue is higher than a threshold position. The system can then send a notification to the device using the contact information. The notification can indicate a position of the device in the queue or an estimated wait time for the device.

When the system is ready to allow the device access to the network, e.g., the device is at the start of the queue, the system can generate a user interface to be displayed at the device prompting a user of the device to start a session. The user can provide the user input indicating an intent to start the session, and the system can start the session at an available port and limit the session to any constraints of the port.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS)

receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method implemented in one or more wireless access points, the method comprising:

receiving, at the one or more wireless access points and from a first device, a request to connect to a first network through a wireless network managed by the one or more wireless access points, wherein the one or more wireless access points is controlling access to the first network through a plurality of ports, wherein each port allows a device that is wirelessly connected to the port to access the first network;

determining each port in the plurality of ports is connected to a respective device, each respective device being allowed to access the first network through the respective port, and the first device is not one of the respective devices; and adding the first device to a queue, wherein the queue includes at least a second device that was added prior to the first device, where devices in the queue are not allowed to access the first network while in the queue, the adding the first device to the queue comprising:

providing, to the first device and in response to the request to connect to the first network, data that causes the first device to display in a user interface data specifying a plurality of queues managed by the wireless access point, wherein each queue in the plurality of queues has a set of constraints that are different from the sets of constraints of each other queue in the plurality of queues, and the user interface data describes, for each queue, the set of constraints for the queue;

receiving, from the first device, data indicating the selection of a queue that belongs to the plurality of queues specified in the user interface; and adding the first device to the queue in response to receiving the selection of the queue.

2. The method of claim 1, further comprising:

determining a particular port in the plurality of ports is available to a device in the queue to access the first network;

removing the second device from the queue;

connecting the second device to the particular port to allow the second device to access the first network; and moving the first device up in the queue.

3. The method of claim 1, the plurality of queues comprises a priority queue and a non-priority queue, where the user input specifies to which of the plurality of queues the first device is added, where devices in the priority queue have a higher bandwidth constraint than devices in the non-priority queue when accessing the first network.

4. The method of claim 3, where the user input further specifies payment information in exchange for accessing the priority queue, further comprising:
submitting a payment transaction including the payment information to a payment processor,
receiving authorization of the payment transaction; and
adding the first device to the priority queue.

5. The method of claim 1, where the user interface prompts a user of the first device to select a class of data packets to be accessible to the first device when connected to the wireless network, where the first device is limited to only accessing the selected class of data packets when accessing the first network.

6. The method of claim 5, where the class of data packets comprises at least a class of email data packets or a class of voice data packets.

7. The method of claim 1, further comprising:
computing an estimated wait time for the first device to be allowed access to the first network based on sessions of devices connected to the plurality of ports, where the user interface displays the estimated wait time.

8. The method of claim 1, where each of a subset of ports in the plurality of ports has a respective fixed bandwidth constraint that is less than a bandwidth constraint for the wireless network, where the respective device connected to each respective port in the subset of ports is limited to the respective fixed bandwidth constraint.

9. The method of claim 1, where each of a subset of ports in the plurality of ports is constrained to serve a class of data packets, where the respective device connected to each respective port in the subset of ports is limited to accessing the class of data packets.

10. The method of claim 1, where a subset of ports in the plurality of ports have quality of service guarantees and ports not in the subset do not have quality of service guarantees.

11. A system comprising:
a processor; and
computer-readable medium coupled to the processor and having instructions stored thereon, which, when executed by the processor, cause the processor to perform operations comprising:
receiving, at one or more wireless access points and from a first device, a request to connect to a first network through a wireless network managed by the one or more wireless access points, wherein the one or more wireless access points is controlling access to the first network through a plurality of ports, wherein each port allows a device that is wirelessly connected to the port to access the first network;
determining each port in the plurality of ports is connected to a respective device, each respective device being allowed to access the first network through the respective port, and the first device is not one of the respective devices; and
adding the first device to a queue, wherein the queue includes at least a second device that was added prior to the first device, where devices in the queue are not allowed to access the first network while in the queue, the adding the first device to the queue comprising:
providing, to the first device and in response to the request to connect to the first network, data that causes the first device to display in a user interface data specifying a plurality of queues managed by the wireless access point, wherein each queue in the plurality of queues has a set of constraints that are different from the sets of constraints of each other queue in the plurality of queues, and the user interface data describes, for each queue, the set of constraints for the queue;
receiving, from the first device, data indicating the selection of a queue that belongs to the plurality of queues specified in the user interface; and
adding the first device to the queue in response to receiving the selection of the queue.

12. The system of claim 11, further comprising:
determining a particular port in the plurality of ports is available to a device in the queue to access the first network;
removing the second device from the queue;
connecting the second device to the particular port to allow the second device to access the first network; and
moving the first device up in the queue.

13. The system of claim 11, the plurality of queues comprises a priority queue and a non-priority queue, where the user input specifies to which of the plurality of queues the first device is added, where devices in the priority queue have a higher bandwidth constraint than devices in the non-priority queue when accessing the first network.

14. The system of claim 13, where the user input further specifies payment information in exchange for accessing the priority queue, further comprising:
submitting a payment transaction including the payment information to a payment processor,
receiving authorization of the payment transaction; and
adding the first device to the priority queue.

15. The system of claim 11, where the user interface prompts a user of the first device to select a class of data packets to be accessible to the first device when connected to the wireless network, where the first device is limited to only accessing the selected class of data packets when accessing the first network.

16. The system of claim 15, where the class of data packets comprises at least a class of email data packets or a class of voice data packets.

17. The system of claim 11, further comprising:
computing an estimated wait time for the first device to be allowed access to the first network based on sessions of devices connected to the plurality of ports, where the user interface displays the estimated wait time.

18. The system of claim 11, where each of a subset of ports in the plurality of ports has a respective fixed bandwidth constraint that is less than a bandwidth constraint for the wireless network, where the respective device connected to each respective port in the subset of ports is limited to the respective fixed bandwidth constraint.

19. The system of claim 11, where each of a subset of ports in the plurality of ports is constrained to serve a class of data packets, where the respective device connected to each respective port in the subset of ports is limited to accessing the class of data packets.

20. The system of claim 11, where a subset of ports in the plurality of ports have quality of service guarantees and ports not in the subset do not have quality of service guarantees.

* * * * *

UNITED STATES PATENT AND TRADEMARK OFFICE
CERTIFICATE OF CORRECTION

PATENT NO. : 10,194,378 B2
APPLICATION NO. : 14/801068
DATED : January 29, 2019
INVENTOR(S) : Bird et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 750 days.

Signed and Sealed this
Twenty-seventh Day of August, 2019

Andrei Iancu
*Director of the United States Patent and Trademark Office*